United States Patent
Boyd et al.

(10) Patent No.: US 10,862,963 B2
(45) Date of Patent: Dec. 8, 2020

(54) METHOD AND SYSTEM FOR AUTOMATIC DISCOVERY OF TUNNEL ENDPOINTS IN A BROADCAST NETWORK

(71) Applicant: Tibit Communications, Inc., Petaluma, CA (US)

(72) Inventors: Edward W. Boyd, Petaluma, CA (US); Kevin A. Noll, Leesburg, VA (US); James A. Fletcher, Foxborough, MA (US); Andrew P. Chagnon, North Attleboro, MA (US); Jean-Christophe B. A. Marion, Petaluma, CA (US)

(73) Assignee: Tibit Communications, Inc., Petaluma, CA (US)

( * ) Notice: Subject to any disclaimer, the term of this patent is extended or adjusted under 35 U.S.C. 154(b) by 0 days.

(21) Appl. No.: 16/656,404

(22) Filed: Oct. 17, 2019

(65) Prior Publication Data

US 2020/0128071 A1 Apr. 23, 2020

Related U.S. Application Data

(60) Provisional application No. 62/746,986, filed on Oct. 17, 2018.

(51) Int. Cl.
*H04L 12/46* (2006.01)
*H04L 12/24* (2006.01)
*H04L 29/08* (2006.01)
*H04Q 11/00* (2006.01)

(52) U.S. Cl.
CPC ...... *H04L 67/1068* (2013.01); *H04L 12/4633* (2013.01); *H04L 41/0893* (2013.01); *H04L 41/12* (2013.01); *H04Q 11/0067* (2013.01)

(58) Field of Classification Search
CPC ............ H04L 67/1068; H04L 41/0893; H04L 12/4633; H04L 41/12; H04L 41/044; H04L 41/0806; H04Q 11/0067
See application file for complete search history.

(56) References Cited

U.S. PATENT DOCUMENTS

| | | | |
|---|---|---|---|
| 6,697,983 B1 * | 2/2004 | Chintada | H04L 1/1848 714/748 |
| 7,403,490 B2 * | 7/2008 | Lim | H04L 41/12 370/254 |
| 7,826,378 B2 * | 11/2010 | Absillis | H04B 10/0793 370/241 |
| 8,897,183 B2 * | 11/2014 | Andreasen | H04W 48/16 370/310 |
| 10,498,611 B1 * | 12/2019 | Kloberdans | H04L 41/5054 |

(Continued)

*Primary Examiner* — Aftab N. Khan
(74) *Attorney, Agent, or Firm* — Shun Yao; Park, Vaughan, Fleming & Dowler LLP (57) ABSTRACT

One embodiment provides a system and method for automatic discovery and configuration of tunnel endpoints in a network. During operation, the system can broadcast, from an active tunnel endpoint, a peer-discovery-request message to the network. In response to receiving a peer-discovery-response message from a passive tunnel endpoint, the system can determine whether the passive tunnel endpoint has a tunnel based on the received peer-discovery response. In response to determining that the passive tunnel endpoint does not have a tunnel, the system creates a tunnel between the active tunnel endpoint and the passive tunnel endpoint and exchanges tunnel-configuration messages over the created tunnel.

19 Claims, 11 Drawing Sheets

(56) References Cited

U.S. PATENT DOCUMENTS

| | | | | |
|---|---|---|---|---|
| 2003/0177215 A1* | 9/2003 | Sutherland | ............ | H04L 12/413 |
| | | | | 709/223 |
| 2004/0057727 A1* | 3/2004 | Lim | ........................ | H04L 41/12 |
| | | | | 398/58 |
| 2008/0232794 A1* | 9/2008 | Absillis | .............. | H04B 10/0793 |
| | | | | 398/9 |
| 2012/0099861 A1* | 4/2012 | Zheng | ................ | H04Q 11/0067 |
| | | | | 398/45 |
| 2014/0086580 A1* | 3/2014 | Griswold | ............ | H04L 12/2872 |
| | | | | 398/45 |
| 2018/0103363 A1* | 4/2018 | Faccin | .................... | H04L 12/66 |

* cited by examiner

| UMT MAINTENANCE MESSAGE TYPE | MESSAGE NAME |
| --- | --- |
| 0 | RESERVED |
| 1 | SOLICIT |
| 2 | HELLO |
| 3 | CONFIG-REQ |
| 4 | CONFIG-ACK |
| 5 | CONFIG-NAK |
| 6 | CONFIG-REJ |
| 7 | DELETE-REQ |
| 8 | DELETE-ACK |
| 9 | DELETE-REJ |
| 10-252 | UNASSIGNED |
| 253 | VENDOR-SPECIFIC |
| 254 | UNASSIGNED |
| 255 | RESERVED |

FIG. 7

| TYPE | LENGTH | VALUE |
|---|---|---|
| 1 | n | List of UMT subtypes supported by the UMT peer |
| 2 | n | List of UMT subtypes requested by the UMT peer |
| 3 | 4 | 4-octet random number |
| 4 | n | Encapsulated sub-TLVs |
| 5 | 6 | 48-bit MAC address |
| 253 | n | Unspecified |

802 — row 1
804 — row 2
806 — row 3
808 — row 4
810 — row 5
812 — row 253

FIG. 8

| TYPE | LENGTH | VALUE |
|---|---|---|
| 1 | 1 | 1 – Broadcast<br>2 – Multicast<br>3 – Unicast |
| 2 | 6 | Tunnel Adapter Local Source Address (48-bit MAC Address) |
| 3 | 6 | Tunnel Adapter Local Destination Address (48-bit MAC Address) |
| 4 | 6 | Tunnel Adapter Remote Source Address (48-bit MAC Address) |
| 5 | 6 | Tunnel Adapter Remote Destination Address (48-bit MAC Address) |

METHOD AND SYSTEM FOR AUTOMATIC DISCOVERY OF TUNNEL ENDPOINTS IN A BROADCAST NETWORK

RELATED APPLICATION

This application hereby claims priority under 35 U.S.C. § 119 to U.S. Provisional Patent Application No. 62/746,986, filed on 17 Oct. 2018, entitled "METHOD AND SYSTEM FOR AUTOMATIC DISCOVERY OF TUNNEL ENDPOINTS IN A BROADCAST NETWORK," by inventors Kevin A. Noll, James A. Fletcher, Andrew Chagnon, Edward W. Boyd, Jean-Christophe Marion, and Joshua L. Feinstein.

BACKGROUND

Field of the Invention

This disclosure is generally related to passive optical networks (PONs). More specifically, this disclosure is related to a method and a system for managing a large number of optical line terminals (OLTs) in a PON-based subscriber network.

Related Art

Passive optical networks (PONs) have become the leading technology for next-generation access networks. With the high bandwidth of optical fibers, PONs can accommodate broadband voice, data, and video traffic simultaneously.

Typically, PONs are used in the "first mile" of the network, which provides connectivity between the service provider's central offices and business or residential subscribers. The "first mile" is generally a logical point-to-multipoint network, where a central office serves a number of subscribers. For example, a PON can adopt a tree topology, wherein one trunk fiber couples the central office to a passive optical splitter/combiner. Through a number of branch fibers, the passive optical splitter/combiner divides and distributes downstream optical signals to subscribers and combines upstream optical signals from subscribers.

Transmissions within a PON are performed between an optical line terminal (OLT) and optical network units (ONUs). The OLT generally resides in the central office and couples the PON to a metro backbone, which can be an external network belonging to, for example, an Internet service provider (ISP) or a local exchange carrier. An ONU can reside either at the curb or at an end-user location, and can provide broadband voice, data, and video services. ONUs are coupled to a passive optical coupler, which is coupled to the OLT over an optical link.

A large network implementing PONs can include hundreds, sometimes thousands, of OLTs. Managing a large number of OLTs can be challenging.

SUMMARY

One embodiment provides a system and method for automatic discovery and configuration of tunnel endpoints in a network. During operation, the system can broadcast, from an active tunnel endpoint, a peer-discovery-request message to the network. In response to receiving a peer-discovery-response message from a passive tunnel endpoint, the system can determine whether the passive tunnel endpoint has a tunnel based on the received peer-discovery response. In response to determining that the passive tunnel endpoint does not have a tunnel, the system creates a tunnel between the active tunnel endpoint and the passive tunnel endpoint and exchanges tunnel-configuration messages over the created tunnel.

In a variation on this embodiment, the system can set a timer associated with the tunnel when the tunnel is created.

In a further variation, the system can reset the timer in response to determining that a message between the active and passive endpoints is exchanged over the tunnel.

In a further variation, the system can delete the tunnel in response to detecting that the timer expires.

In a variation on this embodiment, the network can include a passive optical network (PON)-based subscriber network, the active tunnel endpoint belongs to a PON controller, and the passive tunnel endpoint belongs to an optical line terminal (OLT) associated with a PON. The PON controller can control the OLT via the created tunnel.

In a further variation, in response to determining that the passive tunnel endpoint belonging to the OLT has a current tunnel, the system determines whether the PON controller to which the active tunnel endpoint belongs is a primary controller of the OLT. In response to determining that the PON controller is the primary controller of the OLT, the system allows the PON controller to take control of the OLT by deleting the current tunnel and creating a new tunnel.

In a further variation, the PON controller can manage the OLT by receiving PON configuration information from a central database and forwarding the received PON configuration information to the OLT.

In a further variation, the PON controller can be further configured to receive PON status information from the OLT and forward the received PON status information to the central database.

In a further variation, the PON controller can be further configured to release control of the OLT by allowing a timer associated with the created tunnel to expire, thereby resulting in deletion of the tunnel.

In a variation on this embodiment, the peer-discovery-request message, the peer-discovery-response message, or a respective tunnel-configuration message is encapsulated using a universal management tunnel (UMT) protocol data unit (PDU).

One embodiment provides a controller for controlling a plurality of optical line terminals (OLTs) in a passive optical network (PON)-based subscriber network. The controller can include a broadcast module configured to broadcast a peer-discovery-request message to the PON-based subscriber network; a receiving module configured to receive a peer-discovery-response message from an OLT; a determination module configured to determine whether the OLT has a tunnel based on the peer-discovery response; a tunnel-creation module configured to, in response to the determination module determining that the OLT does not have a tunnel, create a tunnel between the controller and the OLT, thereby facilitating the controller to control the OLT; and a tunnel-configuration module configured to facilitate exchange of tunnel-configuration messages between the OLT and the controller over the tunnel.

In a variation on this embodiment, the determination module can be further configured to determine whether the controller is a primary controller of the OLT. The controller can further include a tunnel-deletion module configured to delete an existing tunnel between the OLT and a different controller in response to the determination module determining that the controller is a primary controller of the OLT. The tunnel-creation module can be configured to create a new tunnel between the controller and the OLT subsequent to the tunnel-deletion module deleting the existing tunnel, thereby facilitating the controller to take over control of the OLT.

In a variation on this embodiment, the controller can include a timer module configured to set a timer associated with the tunnel when the tunnel is created.

In a further variation, the timer module can be configured to reset the timer in response to determining that a message between the controller and the OLT is exchanged over the tunnel.

In a further variation, the controller can include a tunnel-deletion module configured to delete the tunnel in response to the timer module detecting that the timer expires.

In a further variation, the controller can be configured to release control of an OLT by allowing the timer to expire.

In a variation on this embodiment, the peer-discovery-request message, the peer-discovery-response message, or a respective tunnel-configuration message is encapsulated using a universal management tunnel (UMT) protocol data unit (PDU).

BRIEF DESCRIPTION OF THE FIGURES

In the figures, like reference numerals refer to the same figure elements.

DETAILED DESCRIPTION

Overview

Embodiments of the present invention provide a system and method for managing a large number of networked devices (e.g., OLTs) using Universal Management Tunnels (UMTs). To avoid the tedious task of manually configuring tunnels on the large number of devices, the system can automatically discover the tunnel endpoints (i.e., the managed devices) by having a management node (e.g., a PON controller) to broadcast a "SOLICIT" message to all nodes in the network. A managed device can respond to the "SOLICIT" message with a "HELLO" message to indicate the tunnel status (e.g., if a tunnel has been established). If the managed device does not have an established tunnel, the management node can reserve and create a tunnel to the managed device. In addition, if the management node sending the "SOLICIT" message is the primary manager of a responding managed device, the primary manager can take over control of the managed device, even if the managed device is currently managed by a different manager. To do so, the primary manager can delete the existing tunnel on the managed device and create a new tunnel. Moreover, each tunnel is created with a time limit defined by a timer, which can be reset each time a message (e.g., a unicast or multicast message) is exchanged on the tunnel. When the timer expires, the tunnel is disconnected and the managed device can be rediscovered by other management nodes.

UMT-Based OLT Management

Conventional PON solutions rely on specially designed PON equipment, such as specially designed OLT chassis with built-in switch line cards, to realize the PON functions. However, such equipment is often expensive and bulky and needs to be managed by a proprietary Network Management System (NMS). PON open architecture, on the other hand, allows complex PON functions to be serviced directly from a data center and utilizes less expensive, off-the-shelf equipment, such as standard servers, Ethernet switches, etc. Moreover, OLT modules pluggable into Ethernet switch ports can be implemented. Compared to the traditional dedicated OLT chassis with built-in management switch line cards, managing a large number (e.g., thousands) of pluggable OLTs can be challenging.

Figure 1:
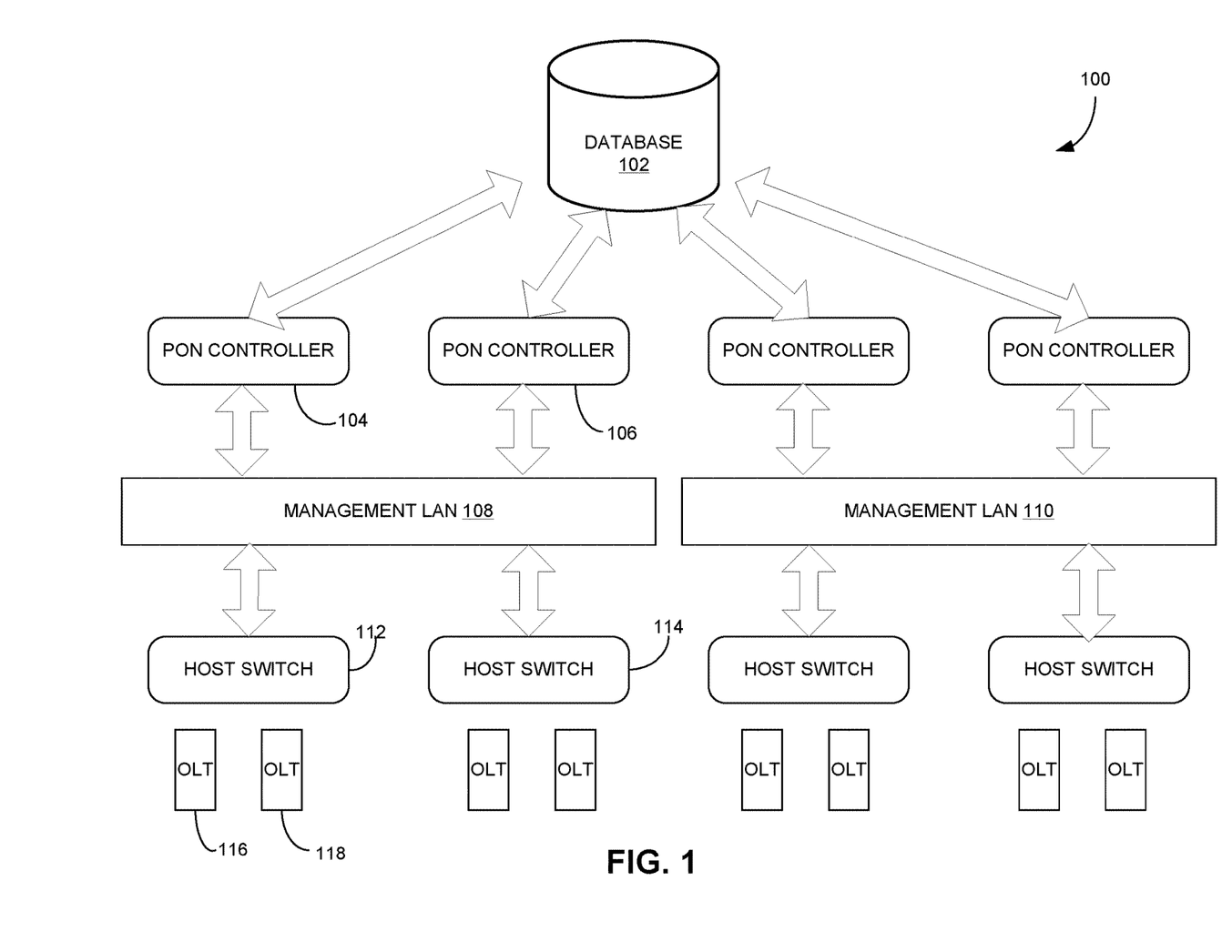
FIG. 1 illustrates exemplary management architecture of a PON-based subscriber network, according to one embodiment.

FIG. 1 illustrates exemplary management architecture of a PON-based subscriber network, according to one embodiment. Network 100 can include a central database 102, a number of PON controllers (e.g., PON controllers 104 and 106), one or more management local-area networks (LANs) (e.g., management LANs 108 and 110), a number of host switches (e.g., switches 112 and 114), and a number of OLTs (e.g., OLTs 116 and 118).

Central database 102 can be a centralized database or a distributed database and can be located in the operator's network or can be cloud-based. Central database 102 can be responsible for storing information (e.g., profile, state, and status) associated with the devices in the network, such as the PON controllers, the OLTs, and the ONUs.

PON controllers can be responsible for controlling the PON devices (e.g., OLTs and ONUs). A PON controller can transfer configurations from central database 102 to the OLTs and ONUs, and it can also transfer information (e.g., state, status, and traffic statistics) associated with the OLTs and ONUs to central database 102. A PON controller can also be referred to as a management application. In some embodiments, a PON controller can include a lightweight application (e.g., without storage) running on a switch-application processor, an edge-computing server, or a data center server. Compared to traditional PON solutions where a proprietary NMS is needed, a simple server can be used to realize some of the PON control functions. In some embodiments, a simple server can serve a few thousand (e.g., 3000) ONUs.

A host switch can provide the layer 2 or layer 3 switching. In some embodiments, a host switch can include a standard Ethernet switch. Each host switch can include a number of ports and a number of OLTs can be coupled to the switch ports.

The PON controllers and switches can be coupled to management LANs. When multiple PON controllers share a same management LAN (e.g., PON controllers 104 and 106 share management LAN 108), they can provide fault-tolerance and load-balancing. More specifically, many OLTs across one or more switches may be coupled to the same management LAN and be managed by the PON controllers coupled to the same management LAN.

Figure 2:
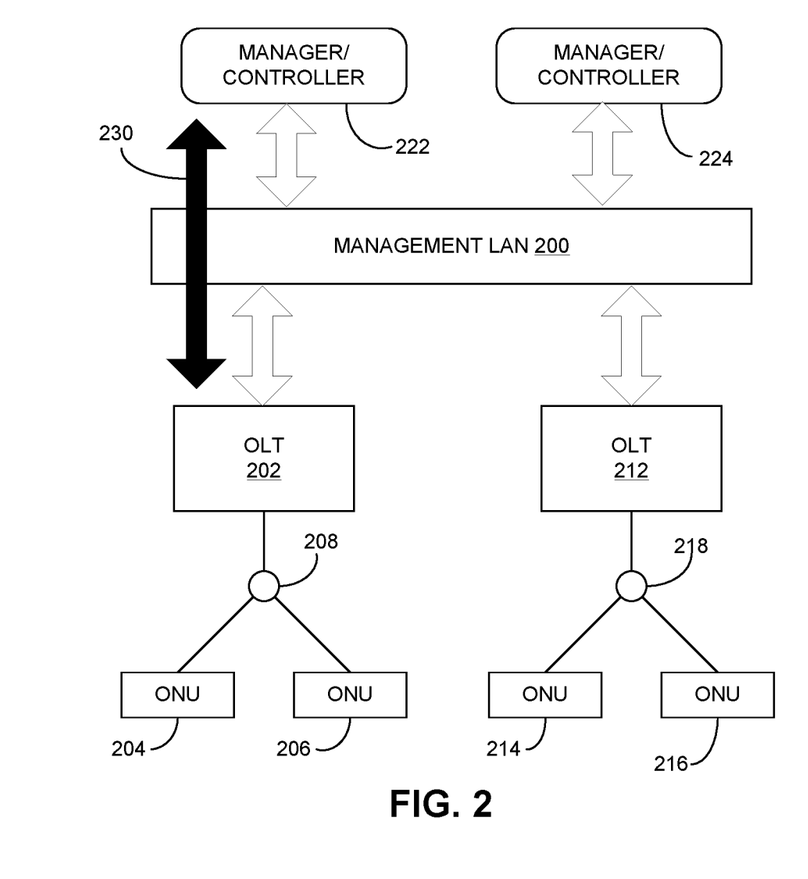
FIG. 2 illustrates management paths in the PON-based network, according to one embodiment.

FIG. 2 illustrates management paths in the PON-based network, according to one embodiment. In FIG. 2, a number of managers/controllers (e.g., management applications) and a number of OLTs can be coupled to a management LAN 200. The terms "manager" and "controller" can be interchangeable in this disclosure. Each OLT can be coupled to a number of ONUs via an optical splitter. For example, OLT 202 can be coupled to ONUs 204 and 206 via optical splitter 208. Similarly, OLT 212 can be coupled to ONUs 214 and 216 via optical splitter 218. All managers/controllers coupled to management LAN 200 can manage an OLT coupled to the same management LAN. In some embodiments, the operator can specify a primary manager/controller for each OLT. For example, the operator can specify that controller 222 is the primary manager for OLT 202, and that manager 224 is the primary controller for OLT 212.

Because the PONs and the network of controllers use different communication protocols, in order to establish a control path to the OLTs and ONUs from a controller, a tunnel needs to be established between a controller and an OLT being controlled by the controller. In this disclosure, the controller can be referred to as an "active" tunnel endpoint. In FIG. 2, a tunnel 230 is established between controller 222 and OLT 202. In some embodiments, both the OLTs and controllers support the Universal Management Tunnel (UMT) protocol, and tunnel 230 can be referred to as a UMT tunnel.

Although it is possible for a network operator to manually configure the tunnels in order to establish the control paths, such a process can be tedious for a large number of OLTs. Moreover, a controller may fail or become overloaded, requiring other controllers to take over its managed OLTs, meaning that old tunnels need to be deleted and new tunnels need to be created. Such a dynamic nature makes it even harder to configure the tunnels manually. To overcome these challenges, embodiments of the present invention provide a novel tunneling protocol that allows a controller (referred to as an active tunnel endpoint) to automatically discover other tunnel endpoints (e.g., to-be-managed OLTs) in the network and to create tunnels when needed. The tunneling protocol can be referred to as a Universal Management Tunnel (UMT) tunneling protocol. Moreover, each tunnel can be created with a time limit. If a tunnel remains idle (i.e., no message is exchanged via the tunnel) beyond such a time limit, the tunnel can be disconnected, and the OLT at one end of the tunnel can be discovered and managed by other controllers. This provides a solution to the problem of controller failover as well as load-balancing.

Figure 3:
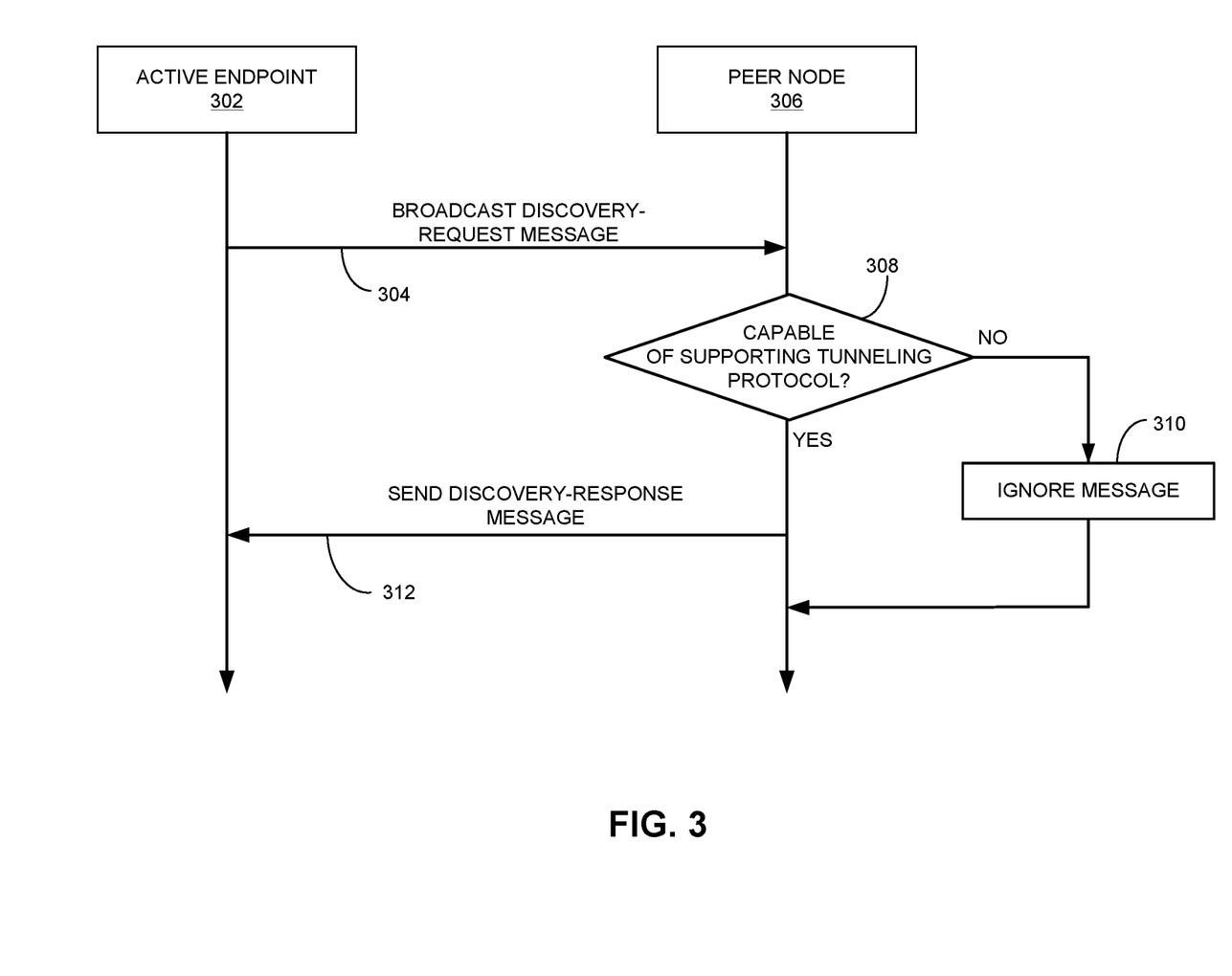
FIG. 3 illustrates an exemplary peer-discovery process according to the UMT tunneling protocol, according to one embodiment.

FIG. 3 illustrates an exemplary peer-discovery process according to the UMT tunneling protocol, according to one embodiment. During operation, an active tunnel endpoint 302 broadcasts a discovery-request message (operation 304). This message can be referred to as a "SOLICIT" message and can be sent to all nodes on the network that are topologically within the bounds of the broadcast domain. More specifically, the SOLICIT message can include the network's broadcast address as the destination address and the unicast address of active tunnel endpoint 302 as the source address. Moreover, the SOLICIT message can also include a protocol value corresponding to the UMT protocol. This addressing scheme ensures that the intervening network will deliver the SOLICIT message to all nodes on the network and the message will not be blocked by intermediate forwarding devices. In some embodiments, active tunnel endpoint 302 can broadcast the SOLICIT message periodically (e.g., every few minutes).

Upon receiving the broadcast message (i.e., the SOLICIT message), a peer node 306 determines whether it is capable of supporting the tunneling protocol by checking the protocol value in the broadcast message (operation 308). If not, peer node 306 ignores the broadcast message (operation 310). If so, peer node 306 responds to the broadcast message with a discovery-response message, which can be referred to as a "HELLO" message (operation 312). The HELLO message can use the unicast address of peer node 306 as the source address and the unicast address of active tunnel endpoint 302 as the destination address. This addressing scheme ensures that the intervening network will deliver the HELLO message to only active tunnel endpoint 302 and the message will not be blocked by intervening forwarding devices Like the SOLICIT message, the HELLO message also includes a protocol value corresponding to the UMT protocol. The SOLICIT and HELLO messages can be encapsulated as a tunneled protocol within the UMT tunneling protocol.

By responding to the SOLICIT message with a HELLO message, peer node 306 enables active tunnel endpoint 302 to know its existence. Moreover, the SOLICIT and HELLO message can each include a list of tunneled protocols supported by the endpoint sending the message. This allows endpoints as well as their capability to be discovered at the same time. Two types of endpoint can exist on the network, the active type and the passive type. Only the active tunnel endpoints are allowed to broadcast the SOLICIT message; hence, they are the only endpoints that are capable of initiating the peer-discovery process. By soliciting responses from other peer nodes (active or passive), an active endpoint can build a table of neighboring peer nodes and their capabilities (active or passive, supported tunnel protocols, etc.). In some embodiments, the active tunnel endpoints belong to the PON controllers or managers, and the passive endpoints belong to the OLTs that are to-be-managed by the PON controllers.

Subsequent to the discovery of a passive peer node (e.g., an OLT), the active tunnel endpoint (e.g., a PON controller) can also determine, based on the status information associated with the passive peer node in the HELLO message, whether the passive peer node (e.g., an OLT) has an attached tunnel. If the OLT is not attached to any tunnel, the OLT does not have a controller. Consequently, the PON controller can create a tunnel to reach the OLT in order to gain control of the OLT. On the other hand, if the OLT is attached to a tunnel, the OLT is currently controlled by a different controller. However, even if the OLT is controlled by a different controller, the PON controller can still take control of the OLT if it determines that it is the primary controller of that OLT. More specifically, the primary controller can take over control of an OLT that is currently managed by a different controller by instructing the OLT to delete the existing tunnel and create a new tunnel. Like the discovery process, only active peed nodes (e.g., the controllers) can initiate the process of creating or deleting a tunnel. A PON controller can establish management tunnels with many OLTs, thus allowing the PON controller to simultaneously control many OLTs. On the other hand, an OLT can only have one management tunnel at a time, meaning that the OLT can only be controlled by one PON controller at a time.

Figure 4:
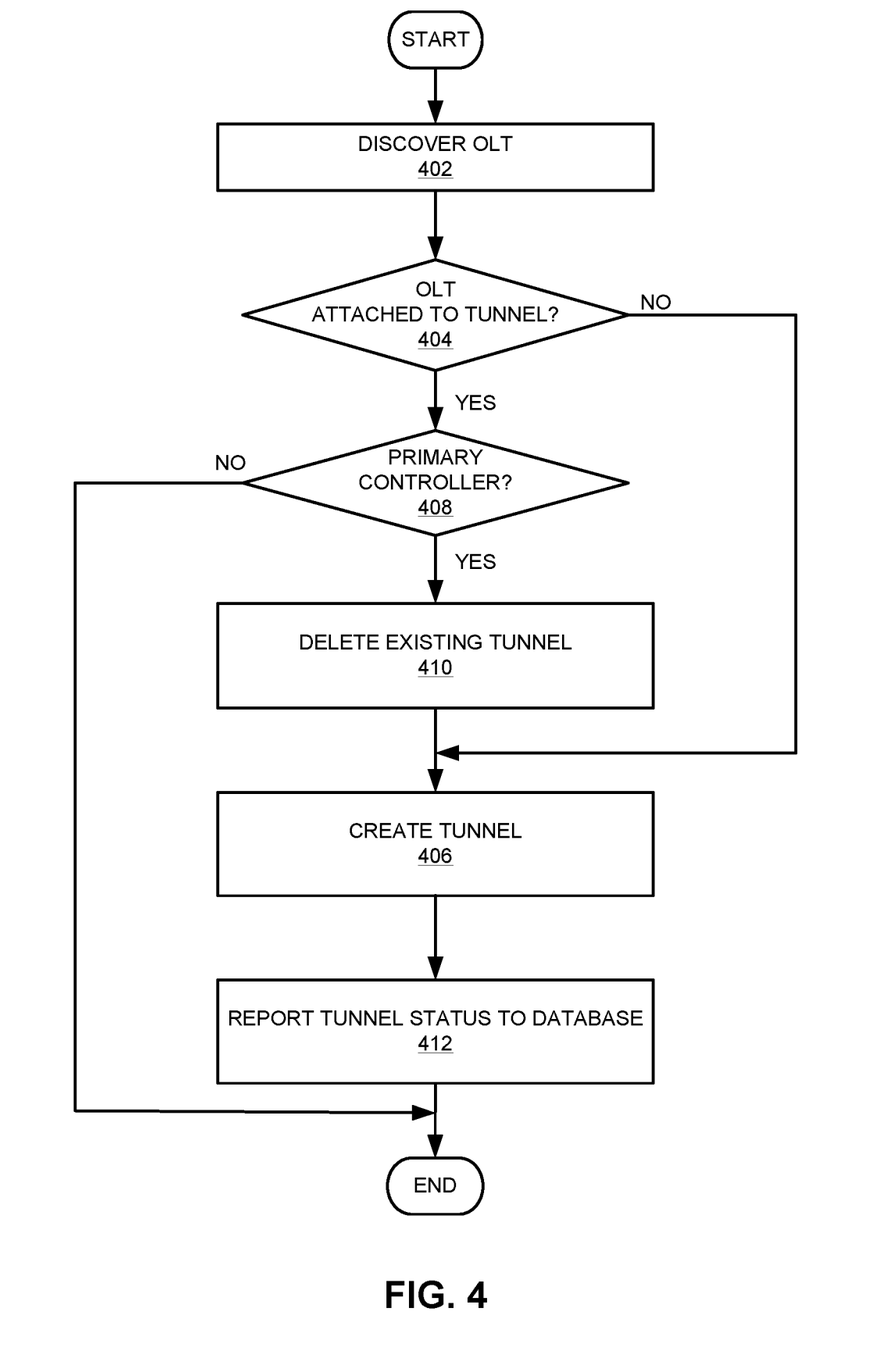
FIG. 4 presents a flowchart illustrating an exemplary process for a PON controller to obtain control of an OLT, according to one embodiment.

FIG. 4 presents a flowchart illustrating an exemplary process for a PON controller to obtain control of an OLT, according to one embodiment. During operation, the PON controller discovers an OLT on the network (operation 402). The PON controller determines whether the OLT has a tunnel (operation 404). In some embodiments, the OLT can include its tunnel status in the HELLO message sent to the PON controller. If the OLT is not attached to any tunnel, the OLT is not being managed by any controller, and the PON controller creates a tunnel between the PON controller and the OLT (operation 406). If the OLT has a tunnel, the PON controller determines whether it is the primary controller of the discovered OLT (operation 408). As discussed previously, a system operator can assign a PON controller as the primary controller for a particular OLT. A primary controller of a PON device (e.g., an OLT) has priority over other controllers to control the PON device. If the PON controller is a primary controller, the PON controller deletes the existing tunnel to which the OLT is attached (operation 410) and creates a new tunnel between the PON controller and the OLT (operation 406). Otherwise, the operation ends. More specifically, when deleting a tunnel, the PON controller sends a tunnel-delete request to the OLT, instructing the OLT to delete a tunnel adapter. Similarly, when creating a tunnel, the PON controller sends a tunnel-configuration request to the OLT, instructing the OLT to create a tunnel adapter. As discussed previously, only the PON controllers can initiate the creation and deletion of the tunnel. The PON controller and the OLT can continue to exchange control messages on the tunnel until agreements are reached on the tunnel operation parameters or until one or both entities give up. The PON controller can optionally report the status of the tunnel (e.g., created or deleted) to the central database (operation 412).

Each tunnel is created with an embedded timer. The expiration time of the timer can be between a few minutes and a few tens of minutes. The PON controller keeps track of the timer value. In some embodiments, the PON controller resets the timer associated with a tunnel each time communication (e.g., unicast or multicast communication) occurs on the tunnel (i.e., each time the PON controller sends a control message to the OLT, or each time the PON controller receives a status report from the OLT). When the timer expires due to the lack of activity on the tunnel, the tunnel becomes inactive and can be deleted. Such a deletion can be initiated by the controller creating the tunnel or by another controller finding out that the OLT has an inactive tunnel during the discovery process. Either controller can delete the tunnel by sending a tunnel-deletion request to the OLT.

Figure 5:
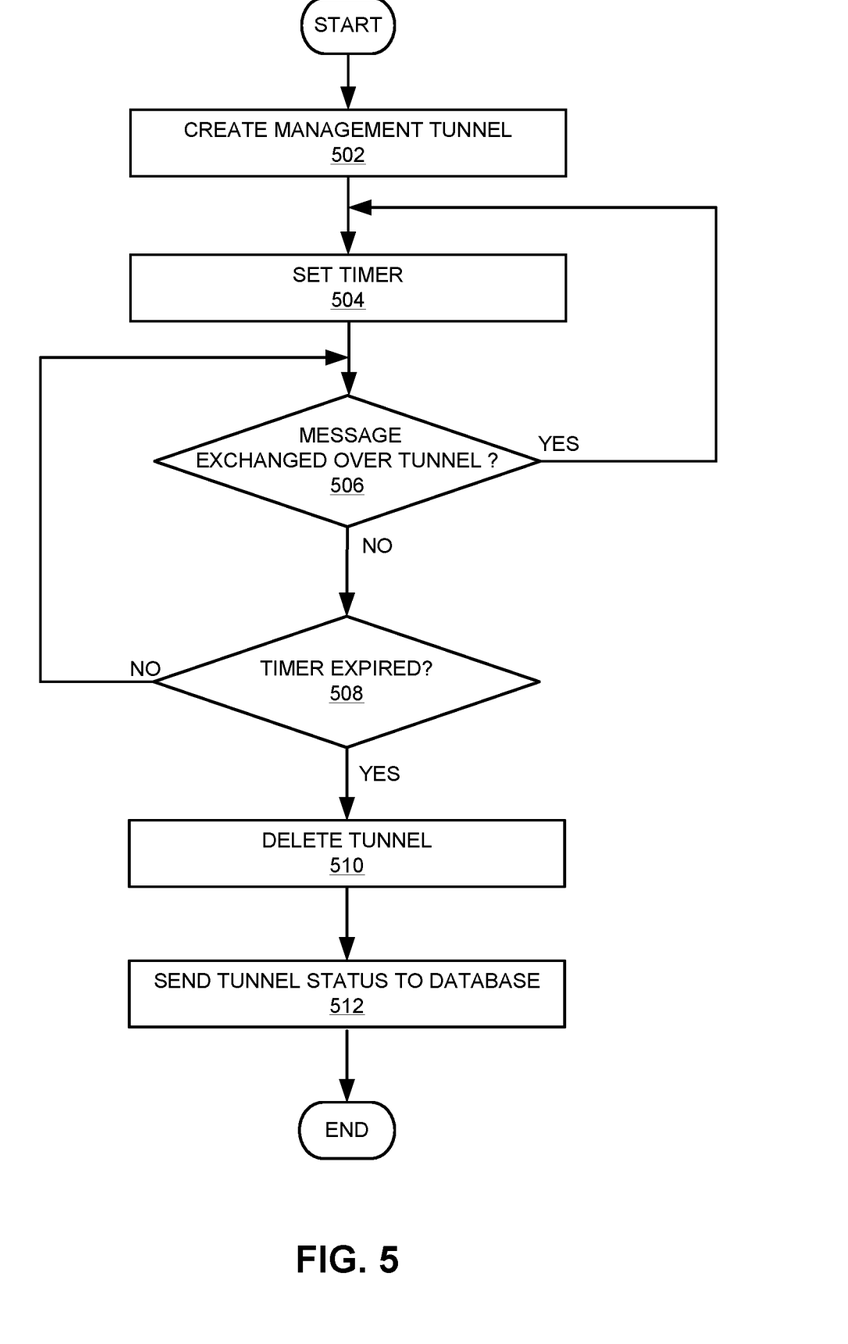
FIG. 5 presents a flowchart illustrating the exemplary operation of the PON controller, according to one embodiment.

FIG. 5 presents a flowchart illustrating the exemplary operation of the PON controller, according to one embodiment. During operation, the PON controller creates a management tunnel for an OLT (operation 502) and sets a timer for the tunnel (operation 504). The PON controller determines whether a message (e.g., a unicast or multicast message) is exchanged over the tunnel (operation 506). The message can be a control message sent by the PON controller to the OLT or a status report sent by the OLT to the PON controller.

If the PON controller determines that a message is exchanged on the tunnel, the PON controller resets the timer (operation 504). If not, the controller determines whether the timer has expired (operation 508). If not, the PON controller repeats operations 506 through 508. If so, the controller deletes the tunnel (operation 510) and can optionally send the status of the tunnel to the central database (operation 512).

Creating tunnels with expiration times allows the system to balance the load (e.g., the controlling of the many OLTs) among multiple PON controllers. For example, a PON controller can be overloaded and can no longer control an OLT that was previously under its control. In response, the PON controller can stop communicating with the OLT to let the timer expire. The expired timer can then trigger the deletion of the tunnel. This way, a PON controller can release a management tunnel when needed (e.g., for loading-balancing purposes) to allow other controllers to discover the OLT. Moreover, allowing the tunnels to expire after a certain inactive time also provides an automatic failover mechanism. More specifically, when a PON controller fails or is being updated, the PON controller stops communicating with the OLT, causing the timer to expire. Once the timer of a tunnel attached to an OLT is expired, during peer discovery, the OLT will include, in its response message (e.g., the HELLO message) to a broadcasted peer-discovery-request message (e.g., the SOLICIT message), the status of the tunnel as being inactive, thus allowing the OLT to be discovered by other PON controllers. In other words, a different PON controller or a new PON controller can discover that the OLT is currently unmanaged and can take over the control. More specifically, the new PON controller can send a tunnel-delete request, requesting the OLT to delete the tunnel adapter of the inactive channel. The new PON controller can also send a tunnel-configuration request, requesting the OLT to create a tunnel adapter. Once the new management channel is created, the new PON controller can send control messages (e.g., OLT configurations received from the central database) to the OLT to configure the OLT. Similarly, the new PON controller can receive status reports from the OLT and forward such reports to the central database.

Figure 6:
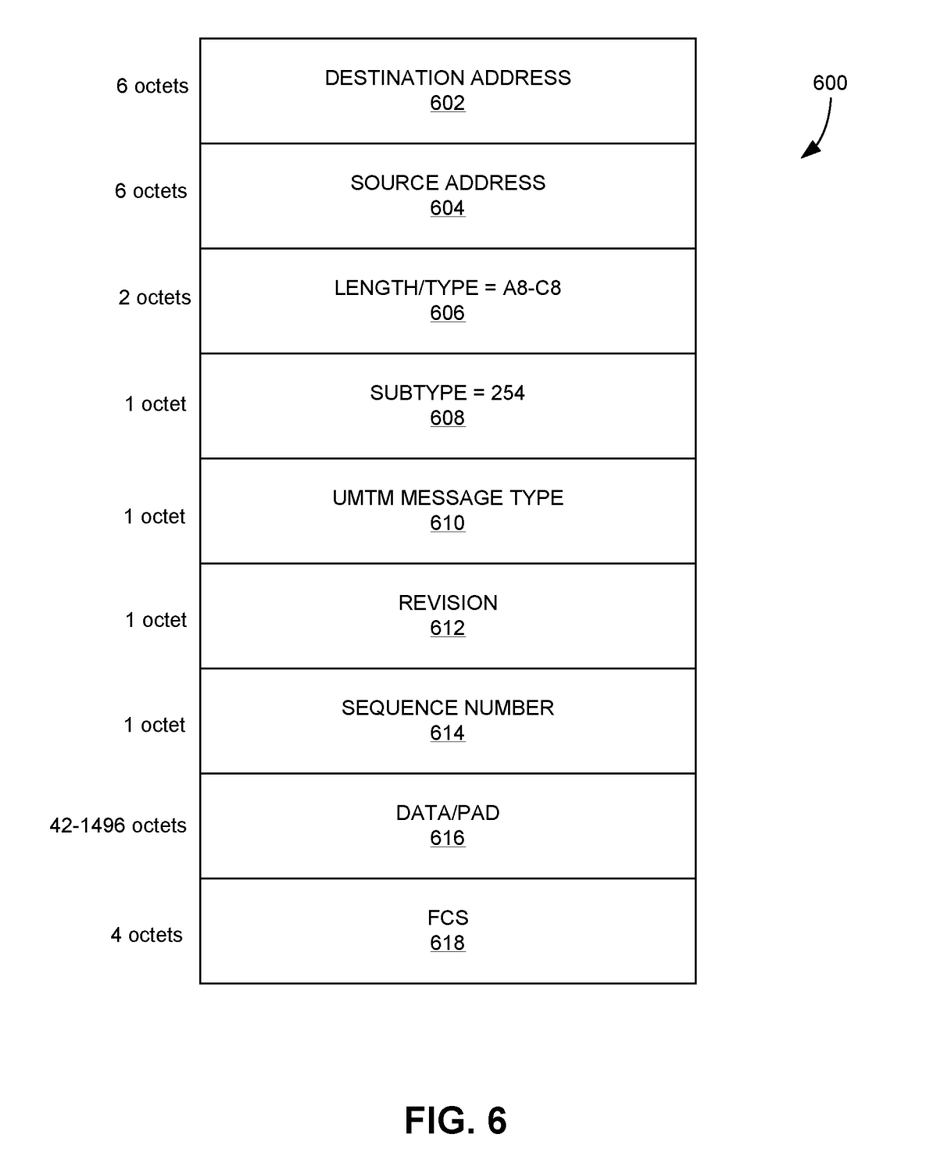
FIG. 6 illustrates an exemplary structure of a UMT maintenance PDU, according to one embodiment.

Service messages (or service data units (SDUs)) exchanged over the UMT tunnel (e.g., the broadcasted tunnel-discovery-request messages, the unicast peer-discovery-response messages, the unicast tunnel-configuration messages, etc.) can be referred to as UMT maintenance SDUs and can be encapsulated in the UMT protocol data units (UMTPDUs). FIG. 6 illustrates the exemplary structure of a UMT maintenance PDU, according to one embodiment.

UMT maintenance PDU 600 can include a number of fields, including destination address (DA) field 602, a source address (SA) field 604, a length/type field 606, a subtype field 608, a UMT maintenance (UMTM) message type field 610, a revision field 612, a sequence number field 614, a data/pad field 616, and a frame check sequence (FCS) field 618.

DA field 602 and SA field 604 can each be six octets long and can include the destination and source addresses of PDU 600, respectively. Length/type field 606 can be two octets long. The value of length/type field 606 can be A8C8, which is reserved for the UMT tunneling protocol. Subtype field 608 is one octet long, and its assigned value for the UMT maintenance PDU is 254.

Figure 7:
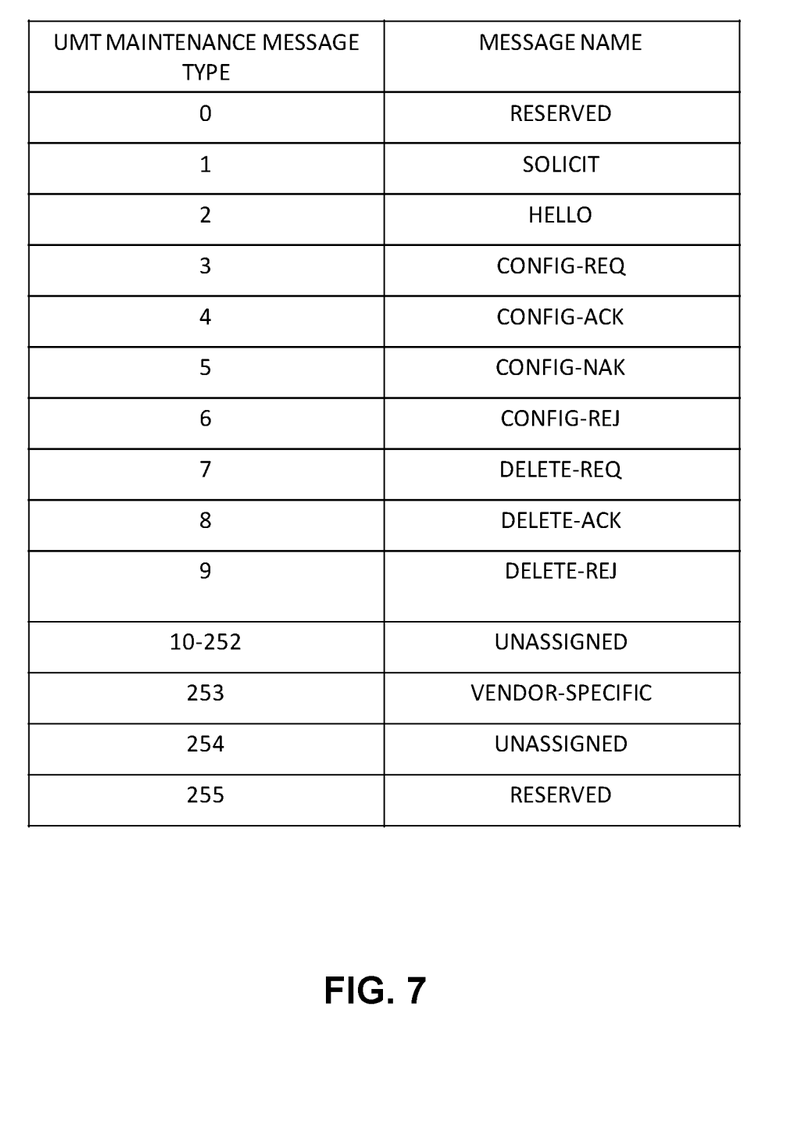
FIG. 7 presents a table listing the values of the UMTM message type field 610 and their corresponding message types, according to one embodiment.

UMTM message type field 610 is one octet long, and its value specifies the type of message (e.g., SOLICIT, HELLO, configuration, etc.) included in UMTM PDU 600. FIG. 7 presents a table listing the values of the UMTM message type field 610 and their corresponding message types, according to one embodiment. Note that the CONFIG-REQ, CONFIG-ACK, CONFIG-NAK, and CONFIG-REJ messages are messages exchanged between the UMT peers when a UMT tunnel is created. Similarly, the DELETE-REQ, DELETE-ACK, and DELETE-REJ are messages exchanged when the UMT tunnel is deleted.

Returning to FIG. 6, revision field 612 is one octet long and can include the revision number of the configuration included in UMT maintenance PDU 600. The revision number can begin at one and increment each time a change occurs in the content of the data being transmitted in UMT maintenance PDU 600. A change causing an increment of the revision can be a change in the value of a field or type-length-value (TLV), or the addition or deletion of a TLV.

Sequence number field 614 is one octet long and can provide a method to signal to the receiving UMT maintenance peer that the UMT maintenance message spans multiple UMTPDUs. Sequence number field 614 facilitates the user of the UMT in managing the fragmentation process.

The length of data/pad field 616 can be between 42 and 1496 octets. Data/pad field 616 can include one or more UMT maintenance TLVs. FCS field 618 can include the frame check sequence for UMT maintenance PDU 600 and can be four octets long.

Figure 8:
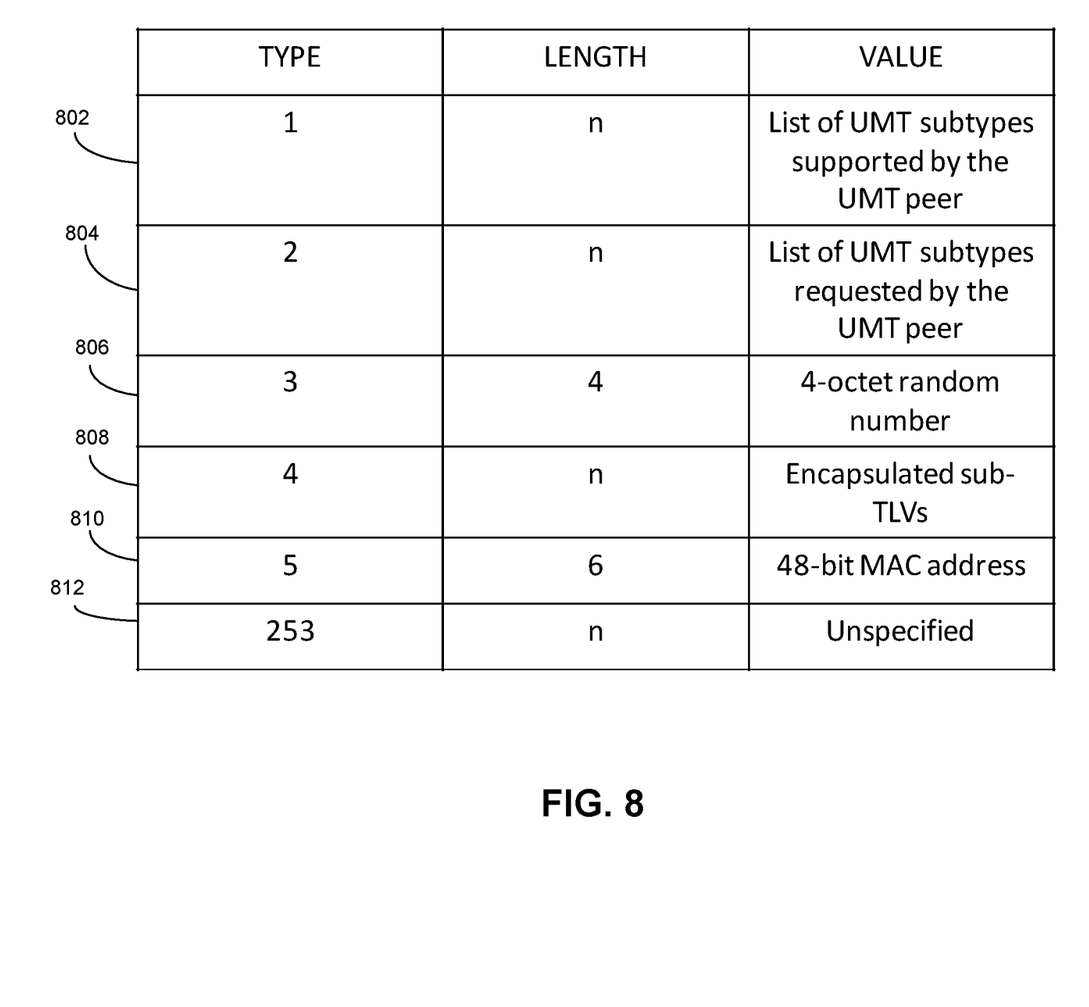
FIG. 8 presents a table listing a number of TLVs to be included in data field 616, according to one embodiment.

FIG. 8 presents a table listing a number of TLVs to be included in data field 616, according to one embodiment. TLV 802 has a type value 1 and describes the list of UMT user types that are supported by the UMT peer. This list can include a series of 1-octet values. Each supported type can be represented by its corresponding value. The length parameter (e.g., n) indicates the number of 1-octet values included in the field.

TLV 804 has a type value 2 and describes the list of UMT user types being requested by the UMT peer for use on a UMT tunnel adapter. This list can include a series of 1-octet values. Each supported type can be represented by its corresponding value. The length parameter (e.g., n) indicates the number of 1-octet values included in the field.

TLV 806 has a type value 3 and describes a transaction identifier. More specifically, the transaction identifier can be a 4-octet random number generated by the UMT peer sending a CONFIG-REQ or DELETE-REQ. The transaction identifier can be used by the requestor and requested UMT peers to correlate the message sent between the UMT peers.

TLV 808 has a type value 4 and describes the characteristics of a tunnel adapter. It can be formatted as a set of encapsulated sub-TLVs, which will be discussed later. When used in a UMT peer maintenance SDU, the tunnel adapter descriptor can only include one and no more than one instance of each of the sub-TLVs.

TLV 810 has a type value 5 and can include the 48-bit MAC address of the UMT peer that is sending the message. TLV 812 has a type value 253 and includes the vendor-specific extension field that can be used to extend the capabilities of a specific implementation of the UMT peer maintenance SDU. The format of this TLV is implementation-specific. In some embodiments, this field can be formatted as an encapsulated set of sub-TLVs.

Figure 9:
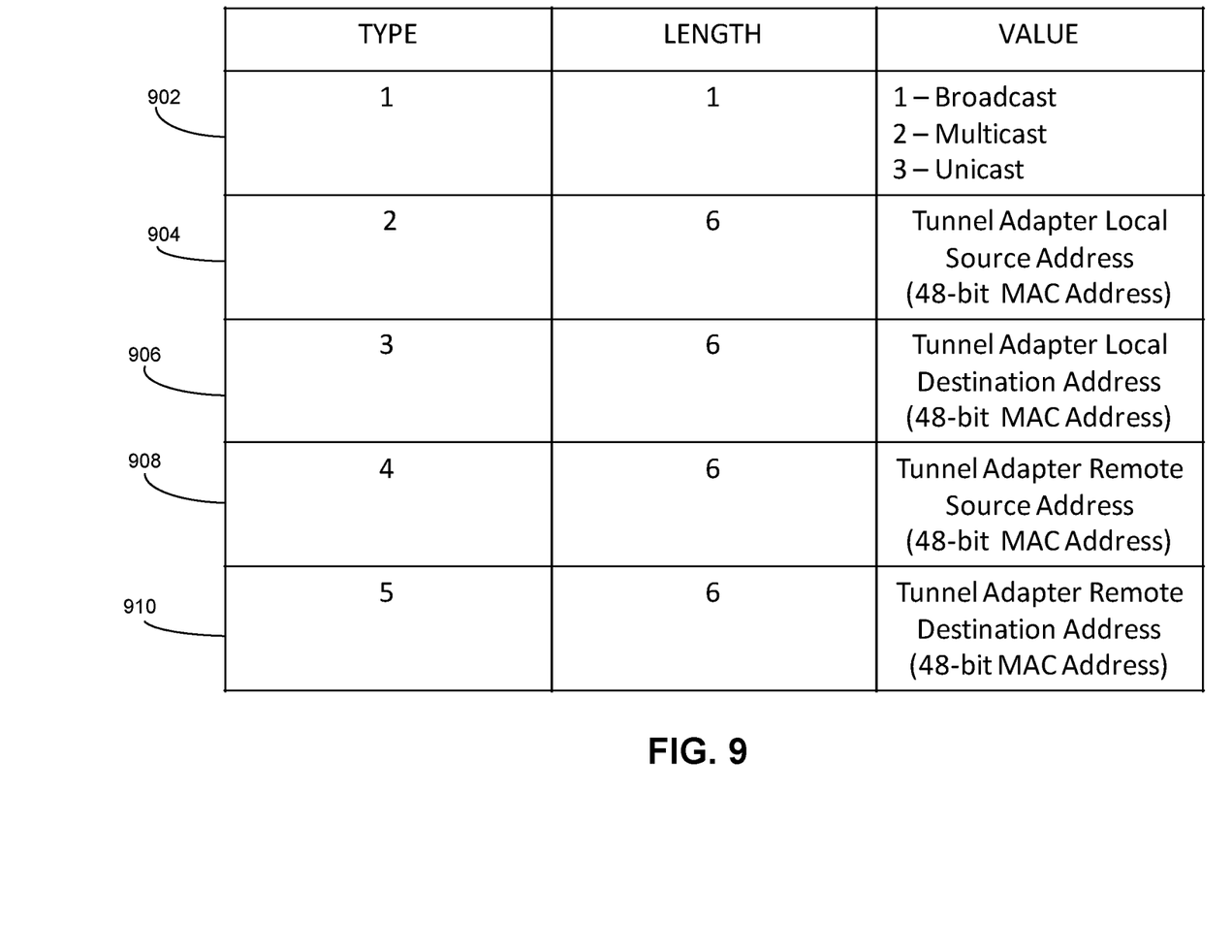
FIG. 9 presents a table listing a number of sub-TLVs included in the tunnel adapter descriptor, according to one embodiment.

FIG. 9 presents a table listing a number of sub-TLVs included in the tunnel adapter descriptor, according to one embodiment. Sub-TLV 902 has a type value 1 and specifies the tunnel adapter type. Sub-TLV 902 is one octet long. The valid field values of sub-TLV 902 can include broadcast, multicast, and unicast. Sub-TLV 904 has a type value 2 and specifies the source address of incoming UMTPDUs to be associated with the local tunnel adapter. Sub-TLV 906 has a type value 3 and specifies the destination address of transmitted UMTPDUs to be associated with the local tunnel adapter. Sub-TLV 908 has a type value 4 and specifies the source address of incoming UMTPDUs to be associated with the remote tunnel adapter. Sub-TLV 910 has a type value 5 and specifies the destination address of transmitted UMTPDUs to be associated with the remote tunnel adapter. The length of each of the sub-TLVs 904-910 is six octets.

Figure 10:
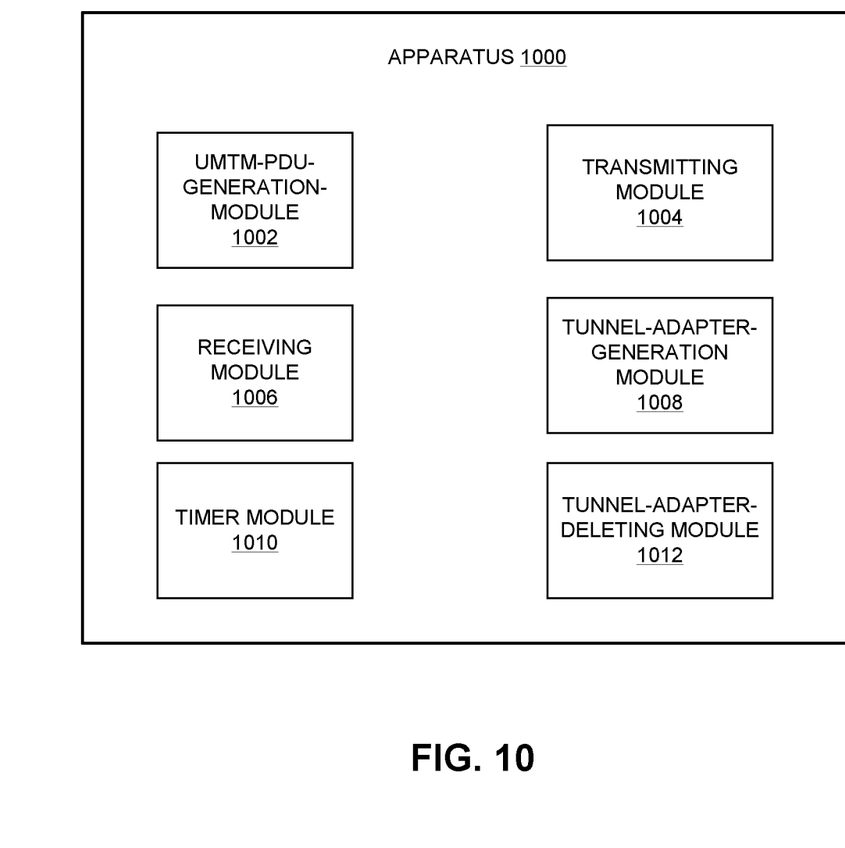
FIG. 10 presents an exemplary apparatus that facilitates automatic tunnel discovery and configuration, according to one embodiment.

FIG. 10 presents an exemplary apparatus that facilitates automatic tunnel discovery and configuration, according to one embodiment. Apparatus 1000 can include a UMTM-PDU-generation module 1002, a transmitting module 1004, a receiving module 1006, a tunnel-adapter-generation module 1008, a timer module 1010, and a tunnel-adapter-deleting module 1012.

UMTM-PDU-generation module 1002 can be responsible for generating various UMTM PDUs, such as SOLICIT, HELLO, messages associated with the creation of a tunnel, messages associated with the deletion of a tunnel, etc. Transmitting module 1004 can be responsible for transmitting the UMTM PDUs. Depending on the type of message, transmitting module 1004 may send the UMTM PDU using the network broadcast address or a unicast address. For example, SOLICIT messages are broadcasted to the network, whereas HELLO messages and configuration requests and responses are sent using their corresponding unicast addresses. Receiving module 1006 can be responsible for receiving the UMTM PDUs. Moreover, in applications associated with PON controllers, receiving module 1006 can be responsible for receiving PON status information from OLTs via established management tunnels and for receiving PON configuration information from the central database. Similarly, transmitting module 1004 can be responsible for transmitting status information received from the PONs to a central database and for transmitting configuration information received from the central database.

Tunnel-adapter-generation module 1008 can be responsible for generating a tunnel adapter when creating a tunnel. Timer module 1010 can be responsible for setting a timer when the tunnel is set. Timer module 1010 can also reset the timer each time communication occurs on the tunnel. Tunnel-adapter-deleting module 1012 can be responsible for deleting the tunnel when the timer expires.

Figure 11:
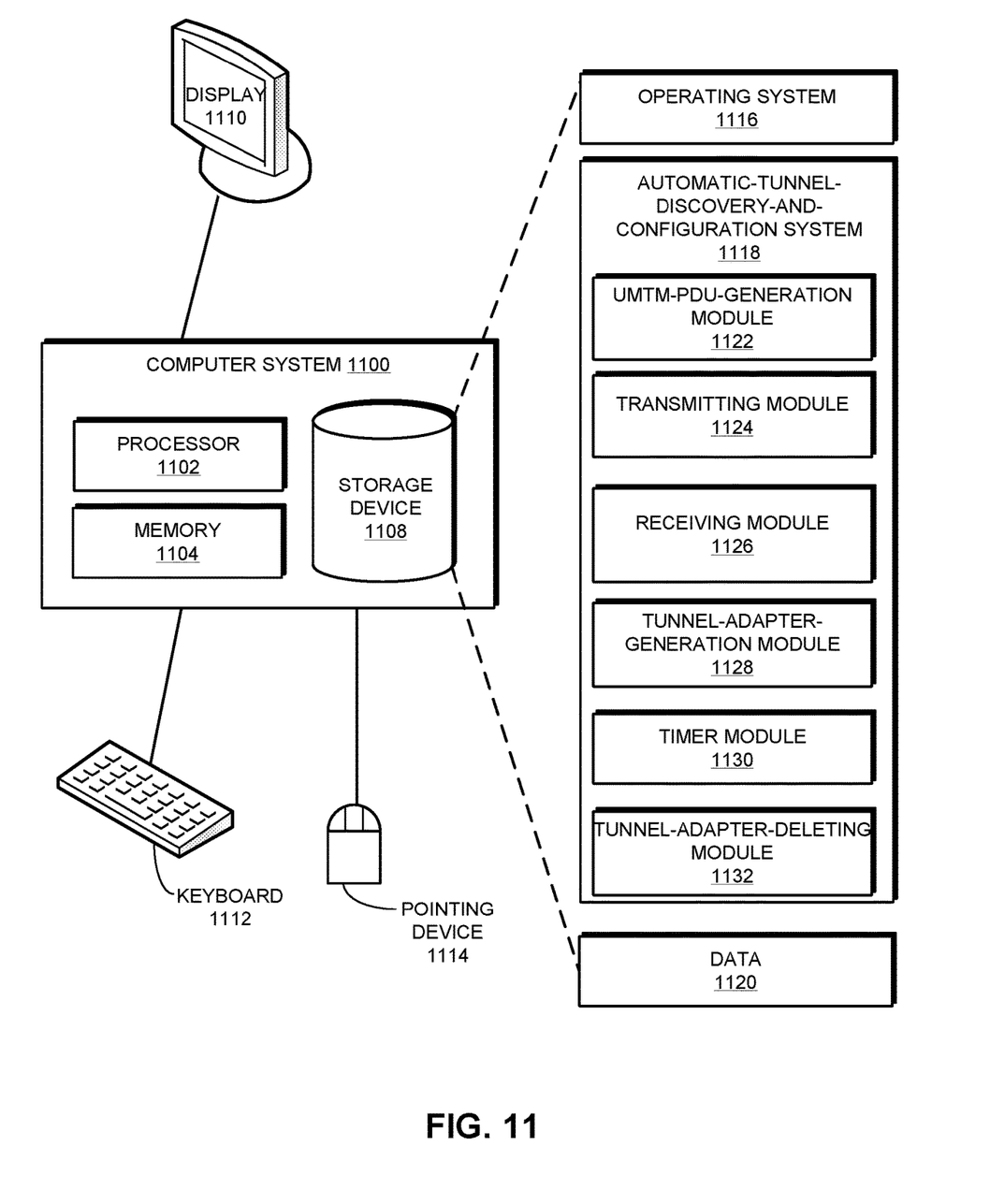
FIG. 11 illustrates an exemplary computer system that facilitates automatic tunnel discovery and configuration, according to one embodiment.

FIG. 11 illustrates an exemplary computer system that facilitates automatic tunnel discovery and configuration, according to one embodiment. In this example, a computer system 1100 includes a processor 1102, a memory device 1104, and a storage device 1108. Furthermore, computer system 1100 can be coupled to a display device 1110, a keyboard 1112, and a pointing device 1114. Storage device 1108 can store code for an operating system 1116, an automatic-tunnel-discovery-and-configuration system 1118, and data 1120.

Automatic-tunnel-discovery-and-configuration system 1118 can include instructions, which when executed by processor 1102 can cause computer system 1100 to perform methods and/or processes described in this disclosure. Specifically, automatic-tunnel-discovery-and-configuration system 1118 can include instructions for implementing a UMTM-PDU-generation module 1122, a transmitting module 1124, a receiving module 1126, a tunnel-adapter-generation module 1128, a timer module 1130, and a tunnel-adapter-deleting module 1132.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for automatic discovery and configuration of tunnel endpoints in a network comprising a passive optical network (PON)-based subscriber network, the method comprising:
   broadcasting, from an active tunnel endpoint, a peer-discovery-request message to the network;
   in response to receiving a peer-discovery-response message from a passive tunnel endpoint, determining whether the passive tunnel endpoint has a tunnel based on the received peer-discovery response;
   in response to determining that the passive tunnel endpoint does not have a tunnel, creating a tunnel between the active tunnel endpoint and the passive tunnel endpoint; and
   exchanging tunnel-configuration messages over the created tunnel;
   wherein the active tunnel endpoint belongs to a PON controller, wherein the passive tunnel endpoint belongs to an optical line terminal (OLT), and wherein the PON controller controls the OLT via the created tunnel.

2. The computer-executable method of claim 1, further comprising:
   in response to determining that the passive tunnel endpoint belonging to the OLT has a current tunnel, determining whether the PON controller to which the active tunnel endpoint belongs is a primary controller of the OLT; and
   in response to determining that the PON controller is the primary controller of the OLT, allowing the PON controller to take control of the OLT by deleting the current tunnel and creating a new tunnel.

3. The computer-executable method of claim 1, wherein the PON controller is further configured to release control of the OLT by allowing a timer associated with the created tunnel to expire, thereby resulting in deletion of the tunnel.

4. The computer-executable method of claim 1, wherein a respective peer-discovery-request message, a respective peer-discovery-response message, or a respective tunnel-configuration message is encapsulated using a universal management tunnel (UMT) protocol data unit (PDU).

5. The computer-executable method of claim 1, further comprising setting a timer associated with the tunnel when the tunnel is created.

6. The computer-executable method of claim 5, further comprising resetting the timer in response to determining that a message between the active and passive endpoints is exchanged over the tunnel.

7. The computer-executable method of claim 5, further comprising deleting the tunnel in response to detecting that the timer expires.

8. The computer-executable method of claim 1, wherein the PON controller manages the OLT by:
   receiving PON configuration information from a central database; and
   forwarding the received PON configuration information to the OLT.

9. The computer-executable method of claim 8, wherein the PON controller is further configured to:
   receive PON status information from the OLT; and
   forward the received PON status information to the central database.

10. A controller for controlling a plurality of optical line terminals (OLTs) in a passive optical network (PON)-based subscriber network, the controller comprising:
    a processor;
    a storage device storing instructions that when executed by the processor cause the processor to perform a method, the method comprising:
    broadcasting a peer-discovery-request message to the PON-based subscriber network;
    receiving a peer-discovery-response message from an OLT;
    determining whether the OLT has a tunnel based on the peer-discovery response;
    in response to determining that the OLT does not have a tunnel, creating a tunnel between the controller and the OLT, thereby facilitating the controller to control the OLT; and
    exchanging tunnel-configuration messages between the OLT and the controller over the tunnel.

11. The controller of claim 10, wherein the method further comprises:
    determining whether the controller is a primary controller of the OLT;
    deleting an existing tunnel between the OLT and a different controller in response to determining that the controller is a primary controller of the OLT; and
    creating a new tunnel between the controller and the OLT subsequent to deleting the existing tunnel, thereby facilitating the controller to take control of the OLT.

12. The controller of claim 10, wherein the peer-discovery-request message, the peer-discovery-response message, or a respective tunnel-configuration message is encapsulated using a universal management tunnel (UMT) protocol data unit (PDU).

13. The controller of claim 10, wherein the method further comprises setting a timer associated with the tunnel when the tunnel is created.

14. The controller of claim 13, wherein the method further comprises resetting the timer in response to determining that a message between the controller and the OLT is exchanged over the tunnel.

15. The controller of claim 13, wherein the method further comprises deleting the tunnel in response to detecting that the timer expires.

16. The controller of claim 15, wherein method further comprises releasing control of an OLT by allowing the timer to expire.

17. A non-transitory computer-readable storage device storing instructions that when executed by a computer cause the computer to perform a method for automatic discovery and configuration of tunnel endpoints in a network comprising a passive optical network (PON)-based subscriber network, the method comprising:

broadcasting, from an active tunnel endpoint, a peer-discovery-request message to the network;

in response to receiving a peer-discovery-response message from a passive tunnel endpoint, determining whether the passive tunnel endpoint has a tunnel based on the received peer-discovery response;

in response to determining that the passive tunnel endpoint does not have a tunnel, creating a tunnel between the active tunnel endpoint and the passive tunnel endpoint, wherein creating the tunnel comprises setting a timer associated with the tunnel; and exchanging tunnel-configuration messages over the created tunnel;

wherein the active tunnel endpoint belongs to a PON controller, wherein the passive tunnel endpoint belongs to an optical line terminal (OLT), and wherein the PON controller controls the OLT via the created tunnel.

18. The non-transitory computer-readable storage device of claim 17, wherein the method further comprises resetting the timer in response to determining that a message between the active and passive endpoints is exchanged over the tunnel.

19. The non-transitory computer-readable storage device of claim 17, wherein the method further comprises deleting the tunnel in response to detecting that the timer expires.

* * * * *